United States Patent [19]
Miyata et al.

[11] Patent Number: 5,400,760
[45] Date of Patent: Mar. 28, 1995

[54] MISFIRE DETECTOR DEVICE FOR INTERNAL COMBUSTION ENGINE

[75] Inventors: Shigeru Miyata; Yasuo Ito, both of Nagoya, Japan

[73] Assignee: NGK Spark Plug Co., Ltd., Nagoya, Japan

[21] Appl. No.: 119,593

[22] Filed: Sep. 13, 1993

[30] Foreign Application Priority Data

| | | | |
|---|---|---|---|
| Sep. 11, 1992 | [JP] | Japan | 4-243069 |
| Aug. 18, 1993 | [JP] | Japan | 5-204030 |
| Aug. 24, 1993 | [JP] | Japan | 5-209144 |

[51] Int. Cl.$^6$ ............................................. F02P 11/00
[52] U.S. Cl. ............................................. 123/630
[58] Field of Search ............... 123/630, 481, 598, 479, 123/631

[56] References Cited

U.S. PATENT DOCUMENTS

| | | | |
|---|---|---|---|
| 3,942,102 | 3/1976 | Kuhn et al. | 123/630 |
| 4,827,891 | 5/1989 | Miura et al. | 123/598 |
| 5,046,470 | 9/1991 | Entenmann et al. | 123/630 |
| 5,159,912 | 11/1992 | Klein et al. | 123/481 |
| 5,226,394 | 7/1993 | Shimasaki et al. | 123/479 |
| 5,309,884 | 5/1994 | Fukui et al. | 123/630 |

FOREIGN PATENT DOCUMENTS

| | | | |
|---|---|---|---|
| 58-19532 | 2/1983 | Japan | 123/630 |
| 2-102376 | 4/1990 | Japan | 123/630 |

*Primary Examiner*—Raymond A. Nelli
*Attorney, Agent, or Firm*—Sughrue, Mion, Zinn, Macpeak & Seas

[57] ABSTRACT

In a misfire detector device for internal combustion engine, an ignition coil is provided to be on-off actuated by a primary current interruptor circuit, each end of the ignition coil being connected to a spark plug installed in each cylinder of an internal combustion engine. A peak voltage detector circuit detects a peak voltage applied across the spark plug electrodes after an end of spark action of the spark plug. A peak voltage value distinction circuit recognizes a misfire when a voltage level exceeds a predetermined level which is detected by the peak voltage detector means after an end of spark action of the spark plug upon running the internal combustion engine at a high speed. A distinction circuit recognizes a variation of angles detected by the crank angle sensor so as to determine the misfire when the variation of angles exceeds a predetermined value upon running the internal combustion engine at a low speed.

8 Claims, 8 Drawing Sheets

MISFIRE DETECTOR DEVICE FOR INTERNAL COMBUSTION ENGINE

BACKGROUND OF THE INVENTION

1. Field of the Invention

This invention relates to a misfire detector device which detects a misfire in an internal combustion engine on the basis of a peak voltage appeared across spark plug electrodes after an end of its spark discharge action.

Description of Prior Art

With the recent requirement of fuel efficiency and purifying emission from an automobile engine, it has been demanded to introduce a misfire detector device which is able to detecting firing condition in each cylinder of the internal combustion engine in order to effect a misfire preventive countermeasure. At the time of misfire, ionized current is less likely to flow through a spark gap because of absence of ionized particles between the electrodes of the spark plug. At the time of normal combustion, the ionized current is likely to flow through a spark gap because of presence of the ionized particles between the electrodes of the spark plug. Therefore, it is found that the spark plug voltage level applied across the spark plug increases after the end of spark action of the spark plug when the misfire occurs in the cylinder of the internal combustion engine compared to the case in which the normal combustion is continuously carried out. By making use of the increase of the spark plug voltage level (referred to as a peak voltage value distinction method), it is possible to detect the misfire in the cylinder of the internal combustion engine.

However, upon running the internal combustion engine with a low speed range, the stepped-up level of the spark plug voltage reduces after the end of the spark action of the spark plug. For this reason, the misfire detection accuracy reduces.

On the other hand, it is known that the crank angle varies depending on the occurrence of misfire. A crank angle variation distinction method is developed to detect the misfire on the basis of variations of the crank angles. It is, however, difficult to accurately detect the misfire particularly upon running the internal combustion engine with a high speed range because the crank moves smoothly, and the crank angle substantially remains unchanged when a single misfire occurs in the respective cylinder of the internal combustion engine.

In the meanwhile, a voltage appears across the spark plug electrodes after the end of the spark action due to an electrical energy stored in the secondary circuit of the ignition coil. A peak voltage after the end of the spark action is compared to a reference voltage level so as to distinguish the misfire from the normal combustion. This is because the voltage appeared across the spark plug electrodes changes depending on an ion density existing mainly between the spark plug electrodes. For this purpose, a moulded conductor is provided around the cable connecting between the spark plug and the distributor to form a static capacity so as to detect a voltage across the spark plug electrodes. The voltage is compared to an voltage value integrated in an integral circuit during a predetermined time period including the spark discharge duration period in order to determine the misfire in the cylinder. The moulded conductor, however, is not provided in each cylinder of the internal combustion engine. The voltage from the conductor probe serves as a signal corresponding to each cylinder in relation to the ignition timing of each cylinder. The voltage thus detected is uniquely determined as only one reference level irrespective of the different cylinders.

However, it is found that the spark plug voltage appeared after the end of the spark action is different depending on not only the geometrical configuration of the electrode and the spark gap between the electrodes, but also swirl currents in a combustion chamber of each cylinder in which the spark plug is installed. In the misfire detector device in which a certain reference value is predetermined to detect the misfire irrespective of the conditions in the cylinder of the internal combustion engine, it is necessary to provide the reference value with a certain allowance so as to inadvertently misinform the misfire on the basis of the detected level of the spark plug voltage in, each cylinder of the internal combustion engine.

Therefore, it is one of the objects of the invention to provide a misfire detector device for internal combustion engine which is capable of accurately detecting the misfire within an entire speed range of the internal combustion engine by ingeniously referring to the peak voltage value distinction method and the crank angle variation distinction method. This enables to detect the misfire in each cylinder of the internal combustion engine so as to contribute to purifying the emission and improving the fuel efficiency.

It is also one of the objects of the invention to provide a misfire detector device for internal combustion engine which is capable of precisely detecting the misfire substantially independent of the geometrical configuration of the electrode, the spark gap between the electrodes and the swirl current in the combustion chamber of the cylinder in which the spark plug is installed.

SUMMARY OF THE INVENTION

According to the invention, there is provided a misfire detector device for internal combustion engine comprising: an ignition coil which is on-off actuated by a primary current interruptor circuit, one end of the ignition coil being connected to a spark plug installed in each cylinder of an internal combustion engine; a peak voltage detector means which detects a peak voltage applied across the spark plug electrodes after an end of spark action of the spark plug; a peak voltage value distinction means which recognizes a misfire when a voltage level exceeds a predetermined level which is detected by the peak voltage detector means after an end of spark action of the spark plug upon running the internal combustion engine at a high speed; a crank angle sensor; and a crank angle variation distinction means which recognizes a variation of angles detected by the crank angle sensor so as to determine the misfire when the variation of angles exceeds a predetermined value upon running the internal combustion engine at a low speed.

According to the invention, there is provided a misfire detector device for internal combustion engine, wherein the dual-polarity type distributorless igniter is provided in which each end of secondary circuit of the ignition coil is connected to the spark plug, and the peak voltage value distinction means recognizes the misfire by comparing a voltage level detected by the peak voltage detector means after the end of the spark action to a voltage level applied across the spark plug of which cylinder is in an exhaust stroke after the end of the spark action at the time when a difference of the two voltage levels exceeds a predetermined value.

According further to the invention, there is provided a misfire detector device for internal combustion engine, wherein the peak value distinction means recognizes the misfire by comparing a voltage level detected by the peak voltage detector means after the end of the spark action of the same spark plug of which cylinder is in a compression stroke to a voltage level detected in the secondary circuit after the end of the spark action of the spark plug of which cylinder is in the exhaust stroke following the compression stroke via an explosion stroke at the time when a difference of the two voltage levels exceeds a predetermined value.

According further to the invention, there is provided a misfire detector device for internal combustion engine, wherein the peak voltage value distinction means recognizes the misfire by comparing a voltage level detected by the peak voltage detector means after the end of the spark action of the spark plug of which cylinder is in a compression stroke to a voltage level detected after the end of other spark plug of which cylinder is in the exhaust stroke in synchronization with the compression stroke at the time when a difference of the two stepped-up voltage levels exceeds a predetermined value.

According further to the invention, there is provided a misfire detector device for internal combustion engine comprising: an igniter having an ignition coil which is on-off actuated by a primary current interruptor circuit, one end of the ignition coil being connected to a spark plug installed in each cylinder of an internal combustion engine: a peak voltage detector means which is connected to detect a peak voltage across electrodes of the spark plug after an end of spark action of the spark plug; a peak voltage average means which individually determines an average value of the peak voltage detected by the peak voltage detector means in each cylinder of the internal combustion engine after the end of a plurality of the spark actions of the spark plug; a reference value determining means which individually determines a reference value in each cylinder of the internal combustion engine on the basis of the average value determined by the peak voltage average means; and a comparator means which compares the peak voltage individually detected by the peak voltage detector means to the reference value individually determined by the reference value determining means so as to detect a misfire in each cylinder of the internal combustion engine.

According further to the invention, there is provided a misfire detector device for internal combustion engine comprising: an igniter having an ignition coil which is on-off actuated by a primary current interruptor circuit, one end of the ignition coil being connected to a spark plug installed in each cylinder of an internal combustion engine; a peak voltage detector means which is connected to detect a peak voltage across electrodes of the spark plug after an end of spark action of the spark plug; a peak voltage average means which individually determines an average value of the peak voltage detected by the peak voltage detector means in each cylinder of the internal combustion engine after the end of a plurality of the spark actions of the spark plug; an average value averaging means which averages average values of a plurality of the cylinders except a specified cylinder so as to obtain a comparative average value; a comparator means which individually compares the average value of the specified cylinder determined by the peak voltage average means to the comparative average value of the average value averaging means so as to detect a misfire.

With the ingenious use of the peak voltage value distinction method which assures a high misfire detection accuracy within a high speed range and the crank angle variation distinction method which assures a high misfire detection accuracy within a low speed range, it is possible to accurately detecting the misfire within an entire speed range of the internal combustion engine.

By comparing the spark plug voltage level in which the spark effectively ignites the air-fuel mixture to the spark plug voltage level in which the spark is wasted uselessly in an exhaust stroke, it is possible to detect the difference of the two spark plug voltage levels to determine the misfire. This makes it possible to accurately detect whether the misfire occurs with minimum data since a spark voltage waveform is analyzed under the circumstances in which variation of the spark voltage waveform remains significantly small irrespective of ther running condition of the the internal combustion engine.

By comparing the spark plug voltage level in which the spark effectively ignites the air-fuel mixture to the spark plug voltage level in which the spark is wasted uselessly in an exhaust stroke within the same cylinder, it is possible to compare the two spark plug voltage levels after the end of the spark action substantially under the same running conditions so as to insure the accurate misfire detection.

By simultaneously establishing the spark plug voltage level in which the spark effectively ignites the air-fuel mixture to the spark plug voltage level in which the spark is wasted uselessly in an exhaust stroke, it is possible to compare the two spark plug voltage levels after the end of the spark action substantially under the same running conditions so as to insure the accurate misfire detection.

With a provision of the peak voltage detector means, the voltage across the spark plug is peak held in each cylinder of the internal combustion engine after the end of the spark action, and the average of the peak voltages is obtained in each cylinder of the internal combustion engine after the end of a plurality of the spark actions. In this instance, the peak voltage detector means may directly detect the peak voltage in the secondary circuit of the ignition coil in each cylinder of the internal combustion engine. Alternatively, the peak voltage detector means may detect the peak voltage in the primary circuit of the ignition coil in each cylinder of the internal combustion engine. Even when only a single sensor is provided as the peak voltage detector means, a voltage from the sensor is used as the spark plug voltage detected in each cylinder of the internal combustion engine by timely dividing the voltage in synchronization with the ignition timing signals. The peak voltage in each cylinder is detected to insure the average of the peak voltage in each cylinder after the end of the spark action.

On the basis of the average value of the peak voltage individually obtained in each cylinder, the average value multiplied by a constant number is determined as a reference value in each cylinder, and the reference value is compared to the peak voltage held after the end of the spark action. On the basis of the comparison, it is detected whether or not the misfire occurs in each cylinder of the internal combustion engine.

In the case in which the misfire occurs consecutively only in a specified cylinder while carrying out a multitude of spark actions repeatedly, it is difficult to precisely detect the misfire only by comparing the reference value and the peak voltage because the voltage detected in the specified cylinder consecutively remains high. In this instance, the average value of the peak voltage in the specified cylinder remains exceedingly high compared to that of the peak voltage in other cylinders of the internal combustion engine. Since the average value of the peak voltage detected in each cylinder is determined after the end of the spark action to present the reference value, it is possible to determine the reference value presented herein independent of the geometric configuration of the spark plug electrodes, the spark gap between the electrodes and the swirl current in each cylinder of the internal combustion engine. As a result that the reference value obtained is pertinent to each cylinder, it is possible to precisely detect the misfire by comparing the reference value to the peak voltage in each cylinder of the internal combustion engine.

With the provision of the comparative average value obtained by averaging the average value of the peak voltage in other cylinders except for a specified cylinder, the average value of the peak voltage in the specified cylinder is compared to comparative average value to distinguish the average of the average value in other cylinders from the average value in the cylinder in which the misfire occurs. This makes it possible to specify the cylinder in which the misfire occurs. Even in the case in which the misfire occurs consecutively in the specified cylinder, and rendering it difficult to accurately determine the average value, it is possible to specify the cylinder in which the misfire occurs by comparing the average value in the specified cylinder to the comparative average value obtained by averaging the average value of the peak voltage in other cylinders except for the specified cylinder.

These and other objects and advantages of the invention will be apparent upon reference to the following specification, attendant claims and drawings.

DETAILED DESCRIPTION OF PREFERRED EMBODIMENTS OF THE INVENTION

Figure 1:
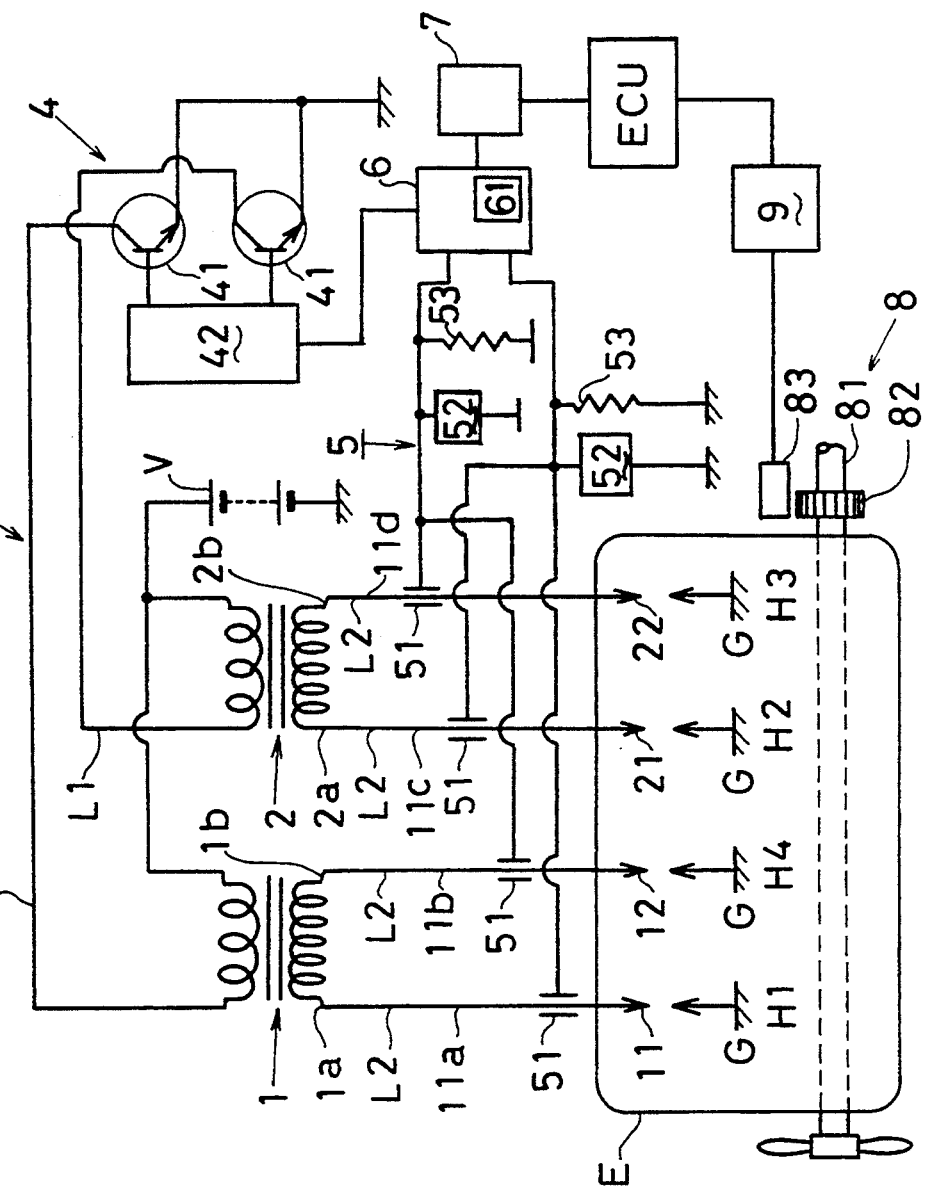
FIG. 1 is a schematic view of an ignition circuit of a dual-polarity type distributorless igniter device for an internal combustion engine in which a misfire detector device is incorporated according to a first embodiment of the invention.

Referring to FIG. 1 which shows a dual-polarity type distributorless igniter device 100 incorporated into a four-cylinder internal combustion engine (E). The igniter device 100 has two ignition coils 1, 2. To negative and positive spark plug voltage terminals 1a, 1b of the ignition coil 1, spark plugs 11, 12 are connected respectively which are installed in first and fourth cylinder H1, H4 of the internal combustion engine (E). To negative and positive spark plug voltage terminals 2a, 2b of the ignition coil 2, spark plugs 21, 22 are connected respectively which are installed in second and third cylinder H2, H3 of the internal combustion engine (E).

Each primary circuit L1 of the ignition coils 1, 2 is connected to a vehicular power source V and a primary current interrupter means 4. Each secondary circuit L2 of the ignition coils 1, 2 is connected at one end 1a, 2a to the spark plugs 11, 21 by way of cables 11a, 11c, and connecting at the other end 1b, 2b to the spark plugs 12, 22 by way of cables 11b, 11d. In the proximity of each of the cables 11a~11d through which a spark plug voltage is applied across the spark plugs, a voltage divider probe 5 is placed. To the voltage divider probe 5, a spark plug voltage detector circuit 6 is connected to detect a spark voltage level applied across each of the spark plugs. To the spark plug voltage detector circuit 5, a peak value distinction circuit 7 is connected to determine in what cylinder a misfire occurs by comparing peak values of the spark voltage waveform appeared between the spark plug electrodes.

The primary current interrupter means 4 has a switching element 41 and a signal generator, 42 controlled by an engine control unit (ECU) which detects a crank angle and throttling degree, and on-off actuating the primary circuit of the ignition coils 1, 2 to appropriately correspond an ignition timing to an ignition advancement angle depending on the load and revolution speed of the internal combustion engine (E). The voltage divider probe 5 has high and low impedance elements 51, 52. The high impedance element 51 is placed around each of the cables 11a~11d between the secondary circuit L2 of the ignition coil and the spark plugs. The low impedance element 52 is connected from a common point Co of the cables 11a~11d to the ground. The high impedance element 51 acts as a conductor sensor arranged to form a 1pF static capacity between the conductor sensor and each of the cables 11a~11d. The low impedance element 52 serves as a 3000 pF capacitor to divide the spark plug voltage in the secondary circuit by the order of 1/3000. In parallel with the capacitor 52, 500 kΩ resistor 53 is connected to form a CR path. With the provision of the voltage divider probe 5, the maximum of 30000 V is reduced to the level of 10 V which is inputted to the spark plug voltage detector circuit 6. The spark plug voltage detector circuit 6 has a peak hold circuit 61 which is reset in cynchronization with an output signal from the signal generator 42, and receives a sampling signal from the engine control unit (ECU) to detect a peak hold value at a certain elapse of time after a primary current interrupter signal is transmitted so as to detect a stepped-up voltage level across the spark plug electrodes after the end of the spark action of the spark plug. Upon determining the misfire, the peak value distinction circuit 7 compares a peak hold value P1 after the end of the spark action to a peak hold value P2 after the end of the spark action which is uselessly wasted in the exhaust stroke of the cylinder. Then the peak value distinction circuit 7 determines the misfire when the peak hold value P1 is greater than two times of the P2 (P1>2P2).

Numeral 8 designates a crank angle speed detector means which detects a crank angle and a rotational position of a crank shaft of the internal combustion engine (E). Numeral 9 designates a crank angle speed variation distinction circuit. The crank angle speed detector means has a toothed wheel 82 attached to a shaft 81 which moves in association with the crank shaft, and having a crank angle speed sensor 83 which detects a rotational position and an angular speed of the toothed wheel 82. The crank angle speed sensor 83 is made by utilizing a magnetic or photoelectronic element.

The crank angle speed variation distinction circuit determines the misfire as follows:

The misfire is determined when the difference of (Ri-Rh) exceeds a predetermined value.

Where T360 is a time required for the crank shaft to move a single rotation measured by the crank angle speed sensor 83 at an upper dead point in each cylinder of the internal combustion engine (E).

T90 is a time required to move a certain crank angle (e.g. 90 CA) after the end of the spark action in each cylinder of the internal combustion engine (E).

R is T90/T360,

Ri is R at the time of initially measuring T90/T360.

Rh is an average value of R's obtained during a certain period of time after initially measuring T90/T360.

To the engine control unit (ECU), output signals each from the crank angle speed variation distinction circuit 9 and the peak value distinction circuit 7 are fed. The engine control unit (ECU) determines the misfire on the basis of the output from the peak value distinction circuit 7 when running the internal combustion engine (E) in the high speed range, while the engine control unit (ECU) determines the misfire on the basis of the output from the crank angle speed variation distinction circuit 9 when running the internal combustion engine (E) in the low speed range. When running the internal combustion engine (E) in the intermediate speed range, the engine control unit (ECU) determines the misfire on the basis of the output from both or one of the crank angle speed variation distinction circuit 9 or the peak value distinction circuit 7 so as to inform an operator of the misfire to check or diagnose the internal combustion engine (E). In this instance, the peak value distinction circuit 7 compares the peak hold value P1 after the end of the spark action to the peak hold value P2 after the end of the spark action of the spark plug of which cylinder is in the exhaust stroke following the explosion stroke so as to determine the misfire when the peak hold value P1 is greater than two times of the peak hold value P2 (e.g. P1>2P2).

Figure 2:
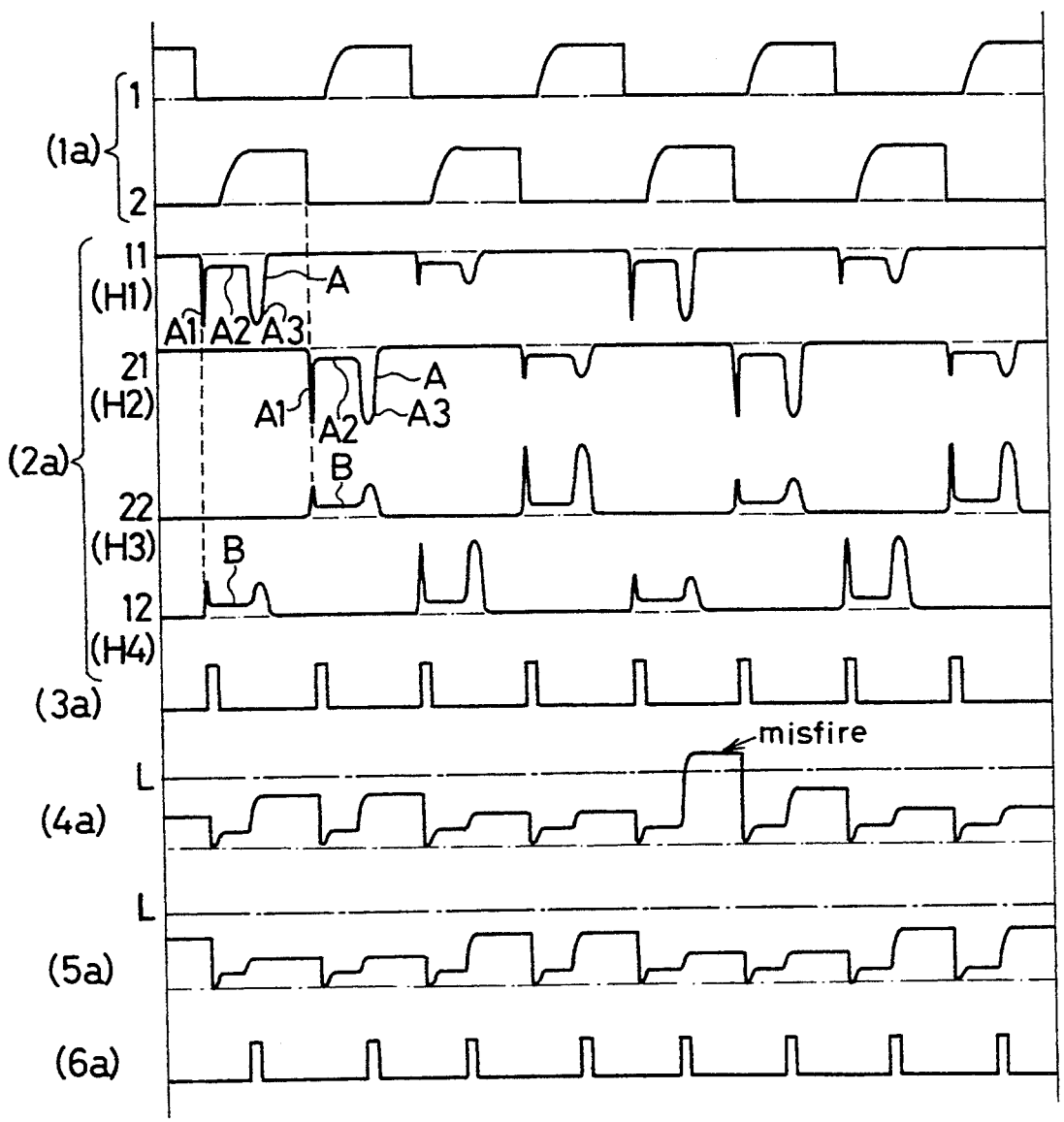
FIG. 2 is a view of spark plug voltage waveforms shown for the purpose of explaining an operation of the misfire detector device.

With the structure thus far described, the signal generator 42 produces a pulse signal to on-off actuate each primary coil of the ignition coils 1, 2 so as to flow a pulse-like primary current in the primary circuit as shown at (1a) in FIG. 2. Across each of the spark plugs 11, 21, 22, 12 installed in the first~fourth cylinders H1~H4, the spark plug voltage is applied as shown at (2a) in FIG. 2. The spark discharge voltage waveform (A) has a high and short voltage waveform portion (A1) due to capacitive discharge, and sustaining a gentle voltage waveform portion (A2) due to inductive discharge following the high voltage waveform portion (A1) to culminate a peak voltage portion (A3) near the end of the spark action of the spark plugs.

A spark discharge waveform (B) appears after the end of the spark action of the spark plug of which cylinder is in the exhaust stroke, is substantially analogous to the spark discharge voltage waveform (A) except for the ½ scale. The the spark discharge voltage waveform (A) appears generally in synchronization with the spark discharge waveform (B), but the latter is initiated earlier than the former because of the low pressure of the cylinder.

As shown at (3a) in FIG. 2, the voltage detector circuit 6 receives a peak hold reset signal, and totaling a voltage waveform appeared in the spark plug of the first cylinder H1 and an inverted voltage waveform appeared in the spark plug of the second cylinder H2. This makes it possible to appear a peak hold voltage waveform of the spark plug voltage stepped-up in the spark plug after the end of its spark action as shown at (4a) in FIG. 2. In the same manner, the voltage detector circuit 6 totals a voltage waveform appeared in the spark plug of the third cylinder H3 and an inverted voltage waveform appeared in the spark plug of the fourth cylinder H4 so as to produce a peak hold voltage waveform as shown at (5a) in FIG. 2. Each level of the peak hold voltage waveforms is detected by the sampling signal generated by the engine control unit (ECU) as shown at (6a) in FIG. 2. The peak value distinction circuit 7 compares the first totaled waveform (4a) and the second totaled waveform (5a) every other single unit wave so as to determine the misfire when one of the waveforms is higher than twice the other (e.g. level L).

Figure 3:
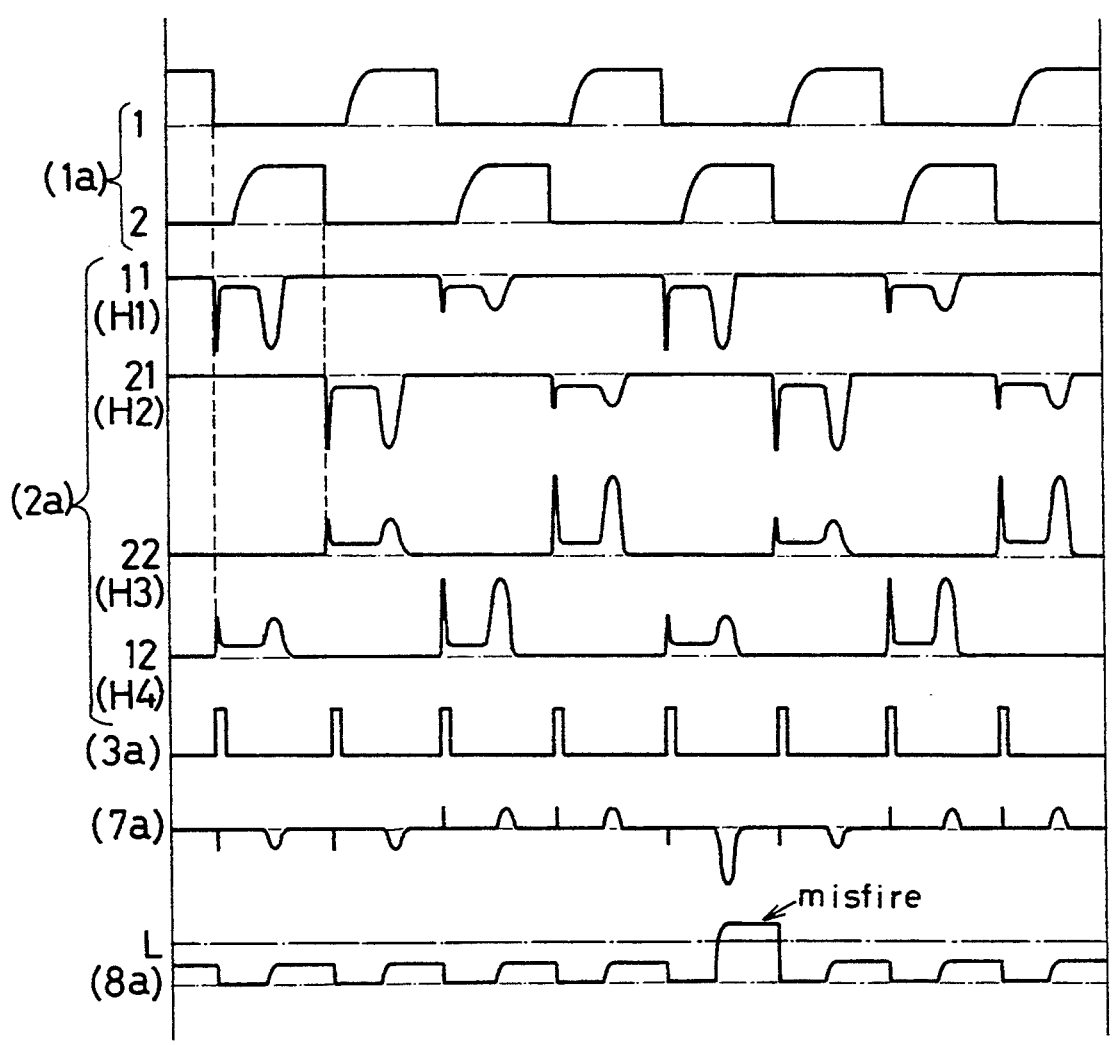
FIG. 3 is a view similar to FIG. 2 according to a second embodiment of the invention.

In a second embodiment of the invention, the spark plug voltages are simultaneously established in the two spark plugs connected to the same ignition coil. One is on the basis of the explosion stroke, and other is on the basis of the exhaust stroke. The peak value distinction circuit 7 compares the two spark plug voltage levels, and the polarity-opposed spark plug voltages are totaled. The peak value distinction circuit 7 determines the misfire when the peak hold value Po of the totaled voltage level exceeds a predetermined value. The voltage detector circuit 6 totals the voltages across the spark plugs each installed in the cylinders H1~H4 as shown at (7a) in FIG. 3. The totaled voltage is inverted in the negative side to detect the peak hold voltage as shown at (8a) in FIG. 3. In this instance, the peak value distinction circuit 7 compares the peak hold value to an integration of the peak hold value multiplied by a constant number (e.g. 2 to obtain the level L), and determines the misfire when the peak hold value exceeds the level L.

According the embodiments of the invention, the spark plug voltage levels are compared which are appeared simultaneously or before and after the ignition timing by effectively utilizing the characteristics of the dual-polarity type distributorless igniter device 100. Upon detecting the misfire, this makes it possible to obviate experimental test data which correspond the spark plug voltage level to the running conditions of the internal combustion engine (E).

Figure 4:
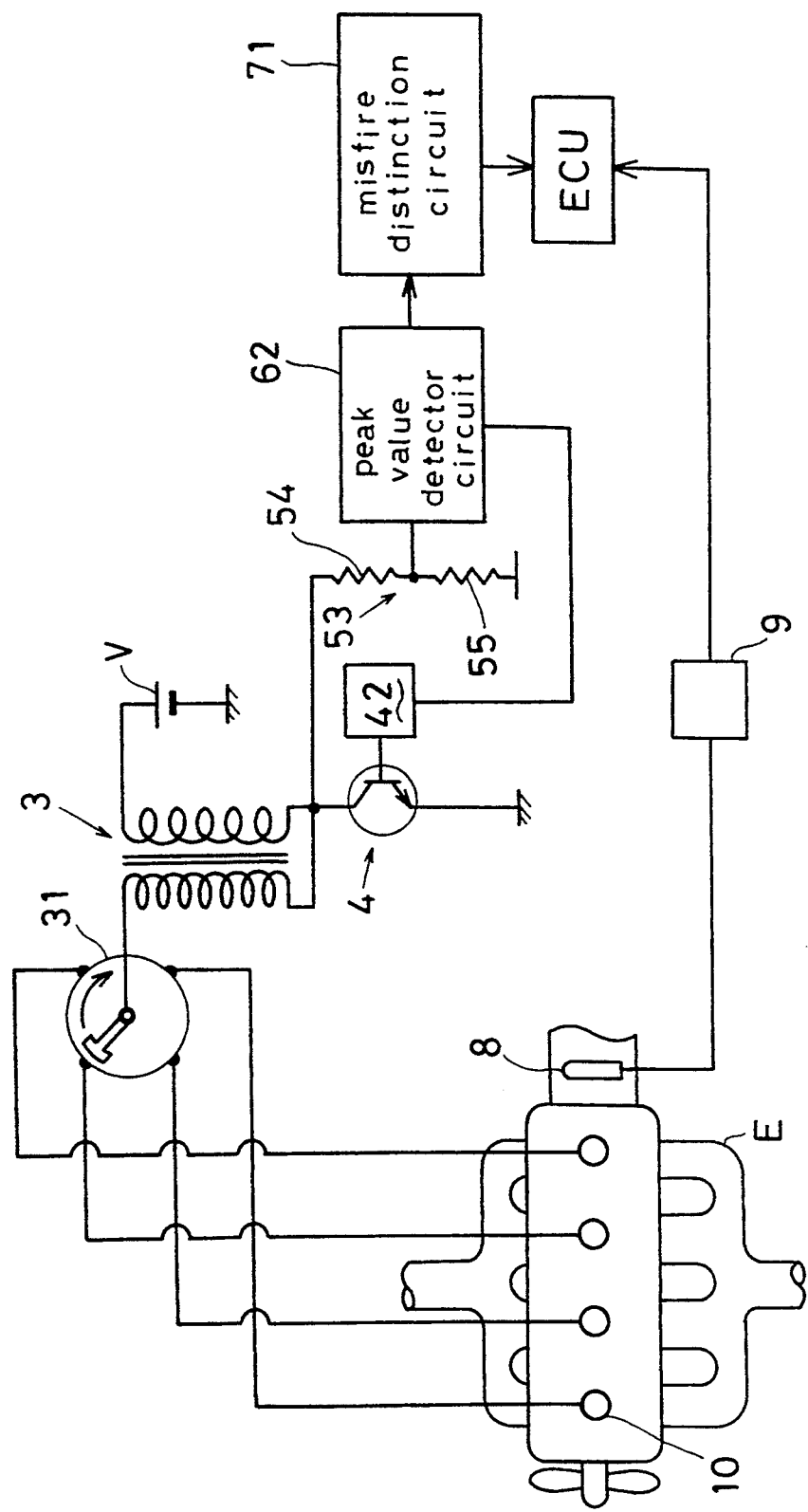
FIG. 4 is a schematic view of a distributor type ignition circuit for an internal combustion engine in which a misfire detector device is incorporated according to a third embodiment of the invention.

FIG. 4 shows a third embodiment of the invention in which a distributor type ignition device 101 is incorporated into the four-cylinder internal combustion engine (E). In this instance, the corresponding reference numerals in FIG. 4 are identical to those in FIG. 1.

Numeral 3 designates a single-polarity type ignition coil, numeral 31 a distributor, and numeral 53 a voltage divider circuit which divides a voltage in a primary circuit of the ignition coil 3 by resistors 54, 55. Numeral 62 is a peak value detector circuit which detects the voltage of the voltage divider circuit 53, and maintains the peak hold of the detected voltage depending on the signal from the signal generator 42. Numeral 71 is a misfire distinction circuit which detects the misfire by comparing the reference level with the peak hold value maintained by the peak value detector circuit. As shown in the third embodiment of the invention, the single-polarity type ignition coil 3 is used in the ignition device 101 with the distributor 31 attached. A voltage across electrodes of a spark plug 10 is determined by detecting a voltage across the primary circuit of the ignition coil 3. As a result, a stable zero voltage of the voltage divider circuit 53 is obtained so that the misfire distinction circuit readily determines the misfire by comparing the peak value of the peak value detector circuit 62 with the reference level.

Figure 5:
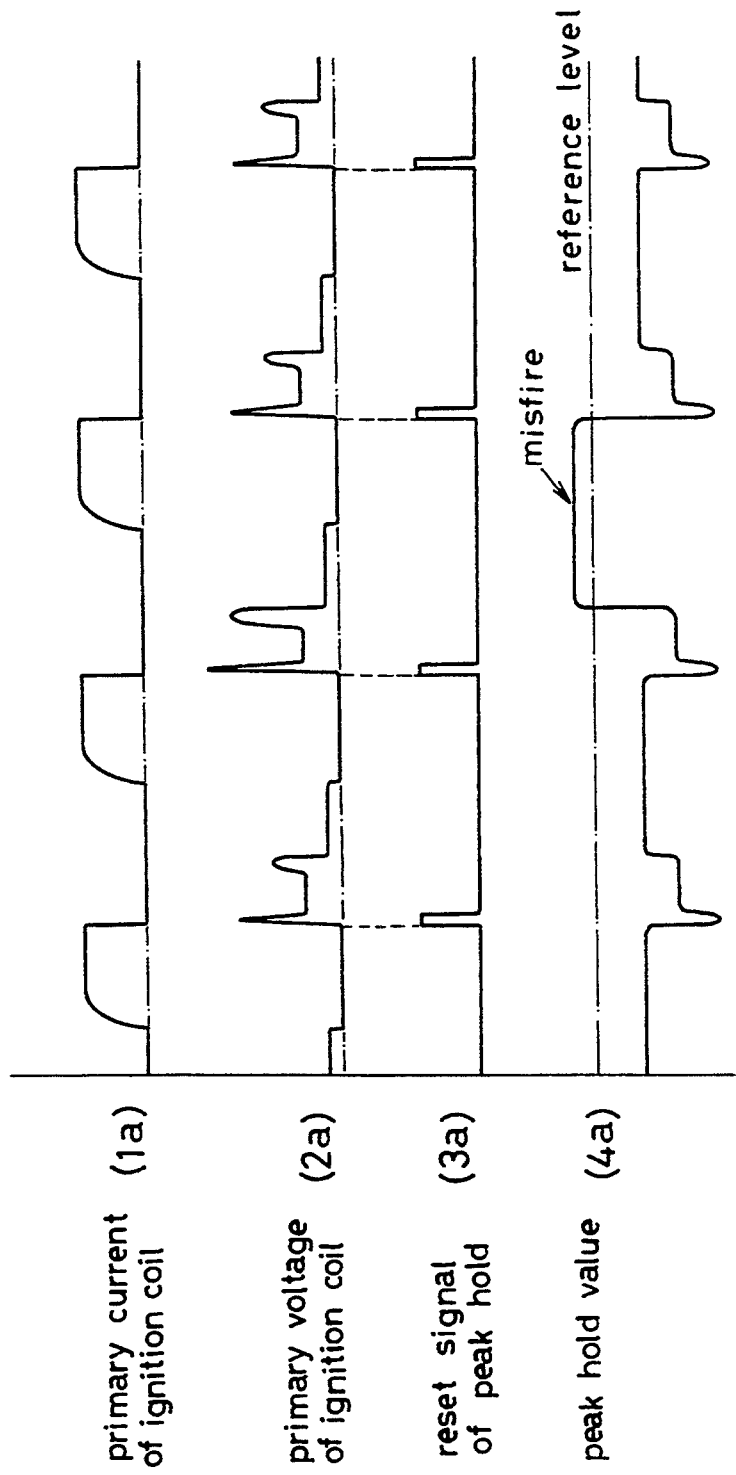
FIG. 5 is a view of spark plug voltage waveforms for the purpose of explaining an operation of the misfire detector device according to the third embodiment of the invention.

Referring to FIG. 5 in which the misfire is detected by the peak value detector means according to a third embodiment of the invention, it is observed that the voltage across the spark plug electrodes can be determined by detecting the voltage across the primary circuit of the ignition coils 1, 2 in the ignition device (DLI) 101. In this instance, the voltage detector circuit 6 detects in the primary circuit the total sum of the voltage level appeared in the spark plug of which cylinder is in the explosion stroke, and the voltage level appeared in the spark plug of which cylinder is in the exhaust stroke. The former voltage level significantly changes depending on whether or not the misfire occurs as opposed against the latter voltage which is maintained stable. Therefore, whether or not the misfire occurs is readily determined depending on the voltage level across the primary circuit of the ignition coils 1, 2.

Figure 6:
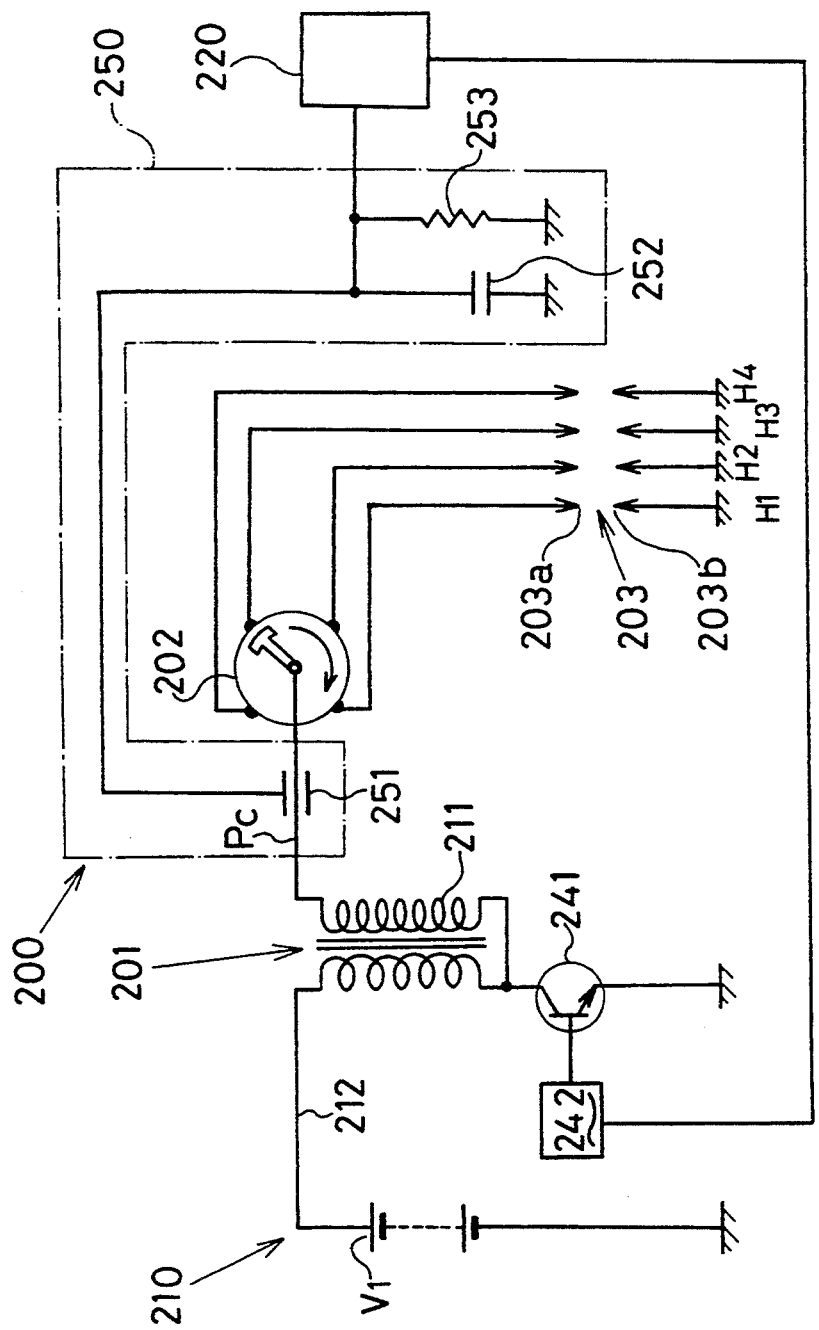
FIG. 6 is a schematic view of an ignition circuit for an internal combustion engine in which a misfire detector device is incorporated according to a fourth embodiment of the invention.

FIG. 6 shows a fourth embodiment of the invention in which a misfire detector device 200 is incorporated into an internal combustion engine. The misfire detector device 200 has an ignition device 210, a misfire detection device 220 and a sensor device 250. In the ignition device 210, numeral 201 designates an ignition coil, numeral 202 a distributor, numeral 203 a spark plug installed in a respective cylinder, numeral 241 a switching transistor element, numeral 242 a signal generator. To each of the spark plugs, a high voltage is applied through a secondary coil 211 of the ignition coil 201 and the distributor 202 with a vehicular battery cell V1 as a power source.

The sensor device 250 which detects a voltage across the spark plug electrodes has a high voltage side capacitor 251 and a low voltage side capacitor 252. The high voltage side capacitor 251 is provided by placing a conductor probe around a plug cable Pc connecting the secondary coil 211 to the distributor 202. The low voltage side capacitor 252 is connected in series with the high voltage side capacitor 251 so as to form a voltage divider circuit which divides the voltage across the spark plug electrodes according to the ratio of two capacitors 251, 252. In parallel with the capacitor 252, a resistor 253 is connected to form a RC path. The high voltage side capacitor 251 has 1 pF static capacity, while the low voltage side capacitor 252 has 3000 pF static capacity. This numerical arrangement divides the voltage across the spark plug electrodes by 1/3000 so as to reduce maximum 30000 V to the order of 10 V. Since the frequency component of a peak voltage is 10 kHz, the magnitude of the resistor is e.g. 500 kΩ to accurately detect the peak voltage with taking an impedance (approx. 5.3 kΩ) of the capacitor 252 into consideration.

Figure 7:
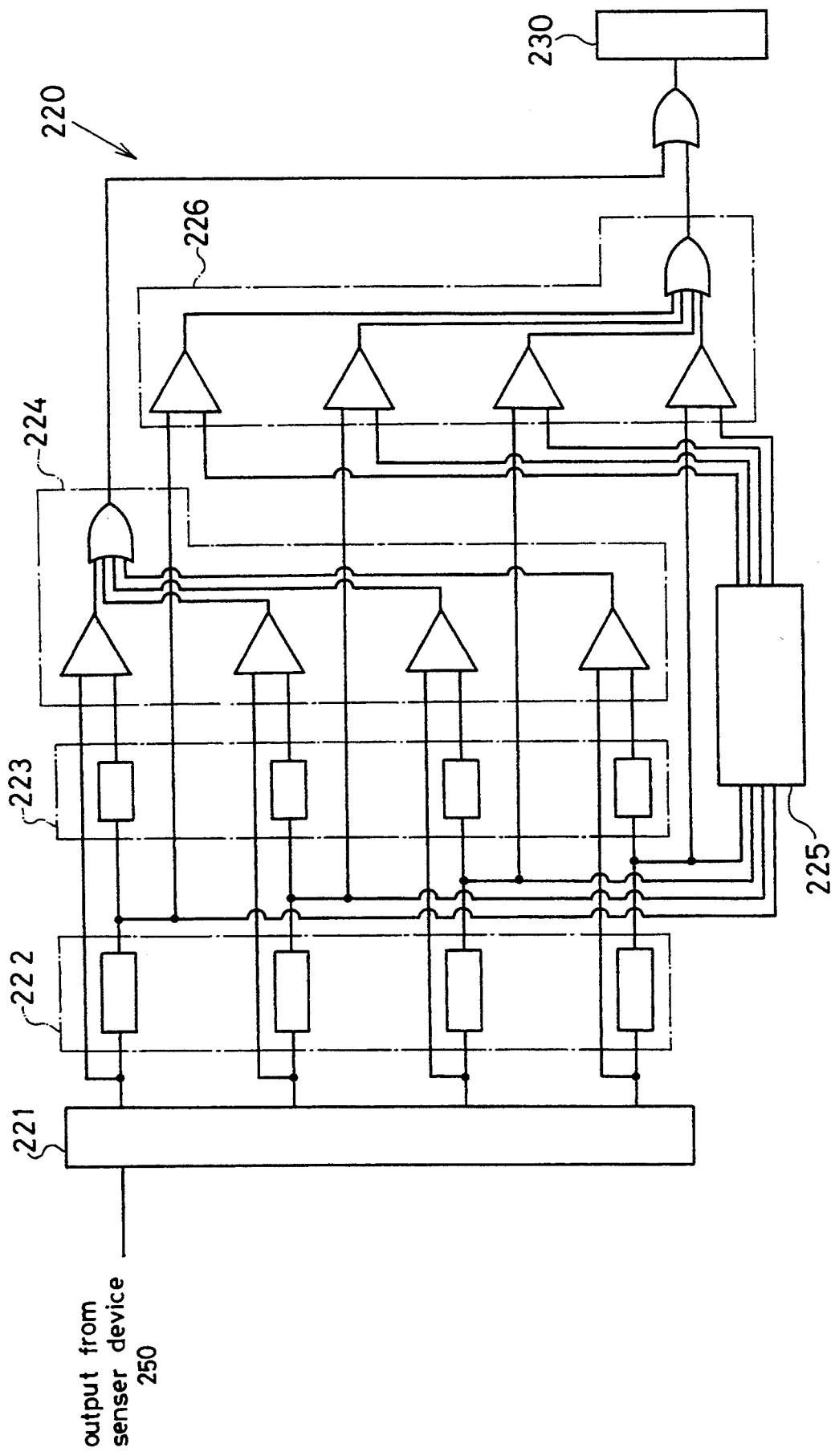
FIG. 7 is a block diagram of the misfire detector device is incorporated according to the fourth embodiment of the invention.

The misfire detector device 220 is comprised with a microcomputer as a main structure as shown in FIG. 7. The misfire detector device 220 has a peak voltage detector portion 221, a peak average calculation portion 222, a distinction level determining portion 223, an individual cylinder comparator portion 224, an average value averaging portion 225, a cylinder comparator portion 226, a misfire distinction portion 230 and other accessory device.

When the peak hold circuit holds a detection signal from the sensor device 250 immediately after the end of the spark action of the spark plug, the peak voltage detector portion 221 detects the detection signal as a peak voltage after the end of the spark action, and dividing the peak voltage into four types of peak voltage signal in accordance with the number of cylinder on the basis of the time division corresponding to the timing signal in which the signal generator 242 sends to apply the spark discharge voltage across the spark plug electrodes in the cylinder of the internal combustion engine.

The peak average calculation portion 222 individually calculates a peak voltage average value in each cylinder on the basis of the peak voltage signal divided by the peak voltage detector portion 221. In calculating the peak voltage average value in each cylinder of the internal combustion engine, it is calculated by in turn adding e.g. 1/20 of the peak voltage signals after the end of e.g. twenty times of the spark actions. Upon an entry of a newly added signal, the oldest signal is cancelled to obtain ever renewal peak voltage average value (method of running average).

The distinction level determining portion 223 determines a distinction level in each cylinder on the basis of the peak voltage average value detected by the peak average calculation portion 222. The distinction level corresponds to the peak voltage average value multiplied by a constant number.

The individual cylinder comparator portion 224 compares the peak voltage signal to the distinction level obtained by the distinction level determining portion 223, and producing a pulse signal according to the comparison result. In this instance, it produces a high level signal according to the ignition timing while maintaining the peak voltage signal higher than the distinction level due to the misfire in each cylinder. The distinction level determining portion 223 produces a low level signal according to the ignition timing while maintaining the peak voltage signal lower than the distinction level due to the normal combustion in each cylinder.

The average value averaging portion 225 further averages the peak voltage average value of each cylinder except a specified one in which the misfire is to be detected in order to obtain a comparative average value so as to compare the peak voltage average value of each cylinder with that of the specified cylinder. The comparative average value is determined by constant times of an average of the peak voltage average value of each cylinder except the specified one in which the misfire is to be detected. The average value averaging portion 225 is independently activated once every 100 times of the spark actions in each cylinder by way of illustration.

The cylinder comparator portion 226 compares the peak voltage average value of the specified cylinder with the comparative average value of other cylinders so as to a pulse signal according to the comparison result. When the peak voltage average value of the specified cylinder significantly exceeds an average of the peak voltage average value of other cylinders, it is assumed that the misfire consecutively occurs in the specified cylinder of the internal combustion engine. Therefore, the cylinder comparator portion 226 produces a high level pulse signal when the misfire is detected in the specified cylinder by the peak voltage signal divided by the peak voltage detector portion 221.

The misfire distinction portion 230 determines in what cylinder the misfire occurs by the high level pulse signal produced from the individual cylinder comparator portion 224 or the cylinder comparator portion 226, and informing the operator of the misfire cylinder through a flicker lamp or the like. It is noted that the misfire cylinder may be informed by memorizing it on an engine computer.

It is possible to specify the mifire cylinder because the timing of the pulse signal of the misfire distinction portion 230 corresponds to the respective cylinder of the internal combustion engine.

With the structure thus described, the switching transistor element 241 is on-off actuated by the ignition timing signal produced from the signal generator 242 to draw a pulse-like primary current in the primary circuit of the ignition coil 201. The pulse-like primary current induces a high voltage in the secondary coil 211 so as to initiate the spark action across spark plug electrodes 203a, 203b. Following the initiation of the spark action, the inductive discharge accompanies. The duration of the spark action sustains by the time period corresponding to the revolution speed of the internal combustion engine, and ends with the decrease of an electrical energy stored in the ignition coil 201.

After the end of the spark action, the voltage across the spark plug electrodes 203a, 203b rises, and culminates a maxmium voltage (2~3 kV at low speed, 5~8 kV at high speed) by the energy stored in the ignition coil 201.

In the misfire detector device 220, the detection voltage from the sensor device 250 is peak held after the end of the spark action, and the peak-held detection voltage is divided according to the ignition timing signal so as to form the peak voltage signal of each cylinder. By using the running average, the peak voltage average value is calculated in each cylinder so as to determine the distinction level in each cylinder on the basis of the peak voltage average value.

The voltage across the spark plug electrodes 203a, 203b lengthens the discharge time period after the end of the spark action so as to present the low peak voltage due to small energy reserved in the ignition coil when the normal combustion occurs in the cylinder. Meanwhile, the voltage across the spark plug electrodes 203a, 203b shorten the discharge time period after the end of the spark action so as to present the high peak voltage due to greater energy reserved in the ignition coil when the misfire occurs in the cylinder. When the peak voltage signal is higher than the distinction level because of the misfire occurred in the cylinder, the individual cylinder comparator portion 224 produces the high level pulse signal in accordance with the ignition timing of the cylinder.

Upon the normal combustion in the cylinder of the internal combustion engine, the individual cylinder comparator portion 224 produces the low level pulse signal in accordance with the ignition timing of the cylinder. Therefore, it is possible to specify in what cylinder the misfire occurs because the high level pulse signal from the misfire detector portion 230 is in accordance with the ignition timing of each cylinder.

In the case in which the misfire consecutively occurs only in a specified cylinder during repeatedly carrying out a multitude of spark actions across the spark plug electrodes 203a, 203b, it may be difficult to compare the respective peak voltage signals because the high peak voltage signal is consecutively maintained.

However, the peak voltage average value becomes exceedingly high in the cylinder in which the misfire occurs consecutively, as opposed against the peak voltage average value the other cylinders. This makes it possible to distinguish the peak voltage average value in the misfire cylinder from that of other cylinders. The cylinder comparator portion 226 produces the high level pulse signal to designate in what cylinder the misfire occurs.

Figure 8:
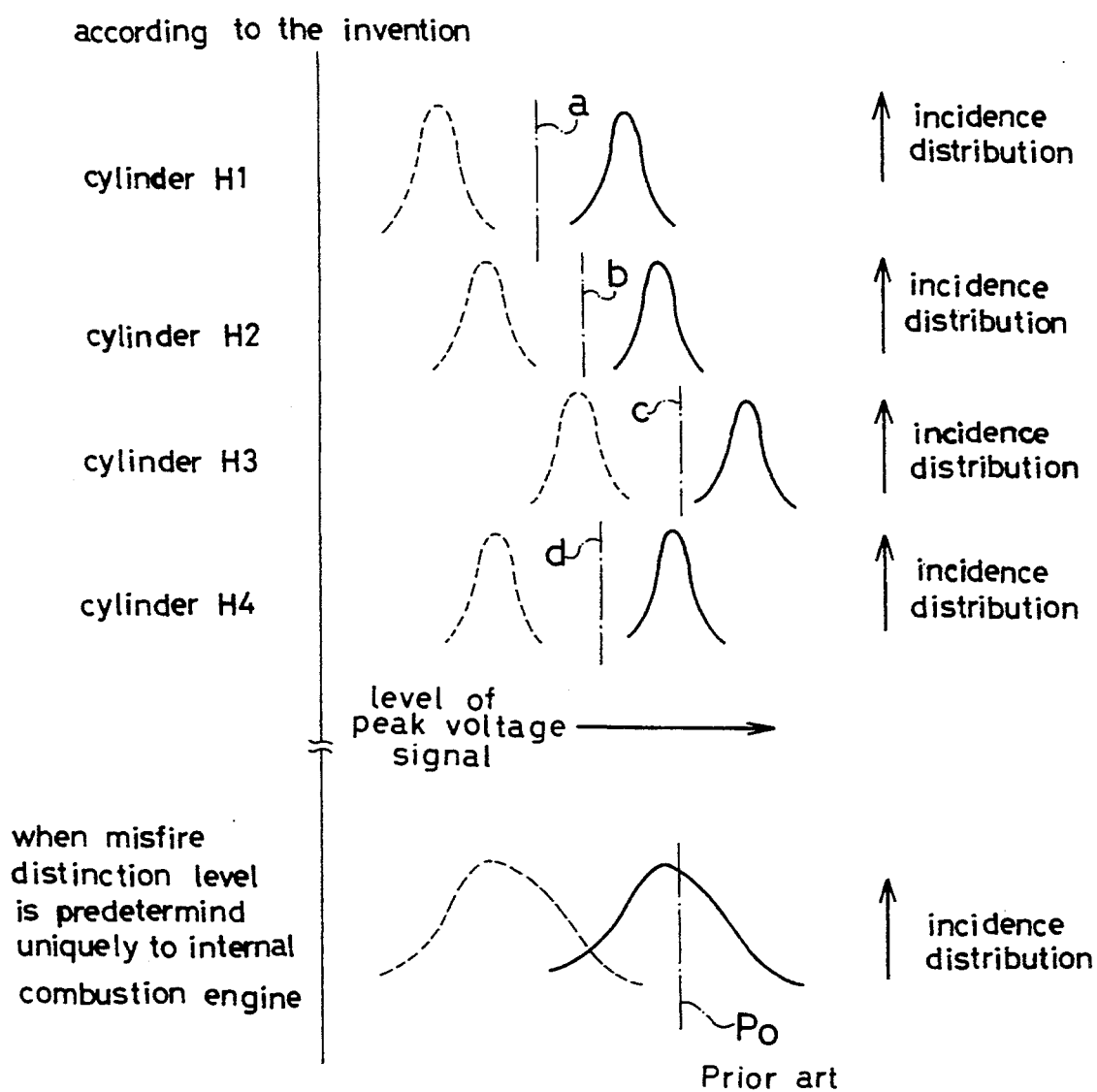
FIG. 8 is a view of peak voltage signals and an incidence distribution showing for the purpose of explaining how the misfire detector device works according to the fourth embodiment of the invention.

FIG. 8 shows an incidence distribution of the peak voltage signal concerning to the normal combustion and the misfire by broken lines and solid line respectively. In FIG. 8, the distinction level is designated by phantom lines a, b, c, d which in turn correspond to the cylinders H1~H4.

According to the invention, it is possible to correctly (approx. 100%) distinguish the misfire from the normal combustion because the distinction level is determined individually depending on the cylinders H1~H4. In the prior art in which the distinction level is predetemined uniquely to the internal combustion engine, it is only possible to detect the misfire by the probability of approx. 50% because it is necessary to arrange the distinction level as shown at (Po) in FIG. 8.

As apparent from the foregoing description, the misfire distinction level is individually determined depending on the cylinders, it is possible to make each of the distinction levels pertain to the geometrical configuration of the electrode, the spark gap and swirl current in each cylinder. As a result, it is possible to precisely detect whether or not the misfire occurs by comparing the respective distinction level (reference value) to the peak voltage in each cylinder of the internal combustion engine.

It is noted that resistors may be used in a primary circuit 212 to form a voltage divider probe so as to detect the voltage across the spark plug electrodes 203a, 203b instead of the sensor device 250 although the sensor device 250 is provided in the secondary coil 211 of the ignition coil 201 in the fourth embodiment of the invention.

It is noted that the crank sensor may be provided in the circuit shown in FIG. 6, and the misfire is determined on the basis of either the peak voltage detector means or a crank angle variation degree detected by the crank sensor.

While the invention has been described with reference to the specific embodiments, it is understood that this description is not to be construed in a limiting sense in as much as various modifications and additions to the specific embodiments may be made by skilled artisan without departing from the spirit and scope of the invention.

What is claimed is:

1. A misfire detector device for internal combustion engine comprising:
an ignition coil which is on-off actuated by a primary current interruptor circuit, one end of the ignition coil being connected to a spark plug installed in each cylinder of an internal combustion engine;
a peak voltage detector means which detects a peak voltage applied across the spark plug electrodes after an end of spark action of the spark plug;
a peak voltage value distinction means which recognizes a misfire when a voltage level exceeds a predetermined level which is detected by the peak voltage detector means after an end of spark action of the spark plug;
a crank angle sensor secured to a crank shaft of the internal combustion engine;
a crank angle variation distinction means which recognizes a variation of angles detected by the crank angle sensor so as to determine the misfire when the variation of angles exceeds a predetermined value; and
the misfire being determined on the basis of the peak voltage value distinction means and/or the crank angle variation distinction means.

2. A misfire detector device for internal combustion engine as recited in claim 1, wherein the dual-polarity type distributorless igniter is provided in which each end of secondary circuit of the ignition coil is connected to the spark plug, and the peak voltage value distinction means recognizes the misfire by comparing a voltage level detected by the peak voltage detector means after the end of the spark action to a voltage level applied across the spark plug of which cylinder is in an exhaust stroke after the end of the spark action at the time when a difference of the two voltage levels exceeds a predetermined value.

3. A misfire detector device for internal combustion engine as recited in claim 2, wherein the peak value distinction means recognizes the misfire by comparing a voltage level detected by the peak voltage detector means after the end of the spark action of the same spark plug of which cylinder is in a compression stroke to a voltage level detected in the secondary circuit after the end of the spark action of the spark plug of which cylinder is in the exhaust stroke following the compression stroke via an explosion stroke at the time when a difference of the two voltage levels exceeds a predetermined value.

4. A misfire detector device for internal combustion engine as recited in claim 2, wherein the peak voltage value distinction means recognizes the misfire by comparing a voltage level detected by the peak voltage detector means after the end of the spark action of the spark plug of which cylinder is in a compression stroke to a voltage level detected after the end of other spark plug of which cylinder is in the exhaust stroke in synchronization with the compression stroke at the time when a difference of the two stepped-up voltage levels exceeds a predetermined value.

5. A misfire detector device for internal combustion engine comprising:
an igniter having an ignition coil which is on-off actuated by a primary current interruptor circuit, one end of the ignition coil being connected to a spark plug installed in each cylinder of an internal combustion engine;
a peak voltage detector means which detects a peak voltage across electrodes of the spark plug after an end of spark action of the spark plug;
a peak voltage average means which individually determines an average value of the peak voltage detected by the peak voltage detector means in each cylinder of the internal combustion engine after the end of a plurality of the spark actions of the spark plug;
a reference value determining means which individually determines a reference value in each cylinder of the internal combustion engine on the basis of the average value determined by the peak voltage average means; and
a comparator means which compares the peak voltage individually detected by the peak voltage detector means to the reference value individually determined by the reference value determining means so as to detect a misfire in each cylinder of the internal combustion engine.

6. A misfire detector device for internal combustion engine comprising:
an igniter having an ignition coil which is on-off actuated by a primary current interruptor circuit, one end of the ignition coil being connected to a spark plug installed in each cylinder of an internal combustion engine;
a peak voltage detector means which detects a peak voltage across electrodes of the spark plug after an end of spark action of the spark plug;
a peak voltage average means which individually determines an average value of the peak voltage detected by the peak voltage detector means in each cylinder of the internal combustion engine after the end of a plurality of the spark actions of the spark plug;
an average value averaging means which averages average values of a plurality of the cylinders except a specified cylinder so as to obtain a comparative average value;
a comparator means which individually compares the average value of the specified cylinder determined by the peak voltage average means to the comparative average value of the average value averaging means so as to detect a misfire.

7. A misfire detector device for internal combustion engine as recited in claim 5 or 6 wherein a crank angle variation degree so as to determine the misfire on the basis of the crank angle variation degree and/or said peak voltage detector means.

8. A misfire detector device for internal combustion engine as recited in claim 1 or 7 wherein said peak voltage detector means are provided in a side of the primary circuit of the ignition coil.

* * * * *